Feb. 26, 1957    F. J. TOBIN    2,782,544
FIBER GLASS DISPLAY ARTICLE AND METHOD OF MAKING SAME
Filed Jan. 7, 1955
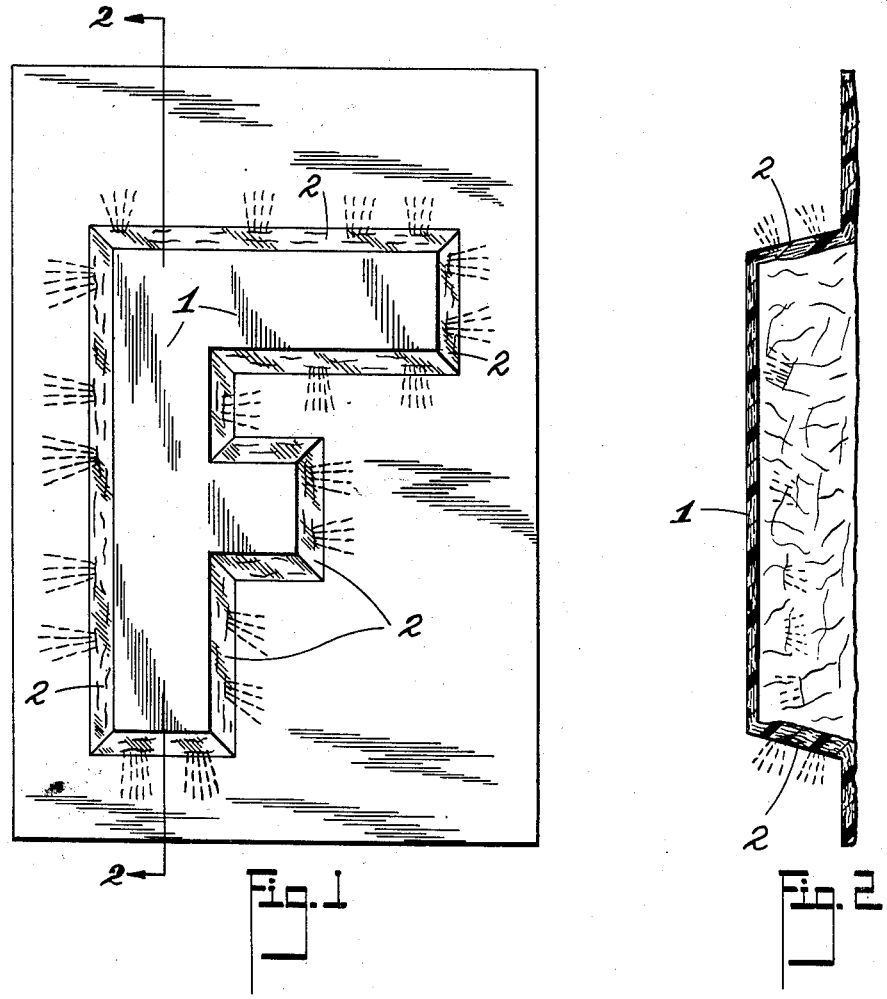
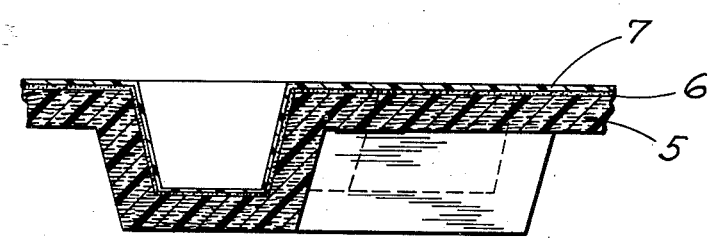
INVENTOR.
FRANK J. TOBIN
BY
RICHEY, WATTS, EDGERTON & McNENNY
ATTORNEYS

United States Patent Office

2,782,544
Patented Feb. 26, 1957

2,782,544

FIBER GLASS DISPLAY ARTICLE AND METHOD OF MAKING SAME

Frank J. Tobin, Cleveland, Ohio

Application January 7, 1955, Serial No. 480,536

3 Claims. (Cl. 41—21)

This invention relates generally to the art of illuminated displays and the making thereof and is particularly concerned with a new fiber glass display article such as a letter, emblem, plaque or the like having a portion which gives a crystalline or sparkling appearance when light passes through it. The present invention also particularly relates to a new method of making such an article.

Fiber glass has been used heretofore to make various articles such as elements of signs or advertising displays but the faces of the articles are opaque and appear to be flush with the surrounding part of the sign when illuminated.

By the present invention I have provided fiber glass articles which appear to be indirectly lighted. They may have a part through which a small amount of light passes and a margin or boundary through which a larger amount of light passes and, in passing, gives a sparkling or crystalline appearance and makes the relatively opaque part appear to stand out in relief. By the present invention I am able to make such articles by a new process which may be carried out in a fiber glass mold.

The term "article" as used herein is intended to mean and include illuminated display devices including signs, letters, emblems, plaques, decorations and the like.

The present invention will be better understood by reference to the accompanying drawings in which, Fig. 1 is a front elevational view of an article embodying the present invention, i. e., a letter forming part of a sign;

Fig. 2 is a cross-sectional view taken on line 2—2 of Fig. 1; and

Fig. 3 is a sectional view through a fiber glass mold in which articles embodying the present invention may be made.

In the drawings, the illustrated article, i. e., the letter F consists of a relatively opaque, colored face portion 1 and a translucent portion 2 extending divergingly outward from the periphery of the portion 1 and at an angle thereto. The face portion of the article consists primarily of fiber glass of the matted variety and is preferably colored. The face portion may also be formed by using the chopped variety of fiber glass and pressing it in a mold. The marginal portion 2 consists primarily of unpressed fiber glass of the chopped variety and preferably is not colored. When a light source is placed back of this article the face portion 1 is lighted by the small amount of light which passes through the relatively opaque portion. At the same time, more light passes through the marginal portion 2 and is refracted and broken up by the randomly positioned fibers so that it gives a sparkling or crystalline appearance, and causes the face portion to stand out in bold relief and to appear to be indirectly illuminated.

Articles embodying the present invention may be made as follows:

A quantity of a certain liquid sufficient for making the desired article is made by mixing a resin, a hardening agent and a catalyst. A polyester resin of the type described in U. S. Patent No. 2,593,787 is suitable for the purpose. As a hardening agent a metallic oxide which will harden a polyester resin such as cobalt oxide may be used. As a catalyst, one of the peroxide catalysts may be used, such as a 60% solution of methyl ethyl ketone peroxide in dimethyl phthalate. These substances may be mixed in the proportions of 100 parts of resin, 2 parts of hardening agent and 2 parts of catalyst. Enough of this mixture to make the face portion of the article in a desired thickness is mixed with a few glass fibers of the chopped variety, i. e., about ½" to 2" in length and of standard size, and a sufficient amount of the desired color. This mixture is placed in the bottom of a mold recess for the article and then fiber glass of the matted variety is cut to the size and shape of the face portion of the desired article and is placed in the mold. If not enough of the liquid is present in the mixture previously placed in the mold to wet the matted fibers, more of the liquid mixture is added to accomplish that result. Then the mixture in the mold is pressed, if desired.

After this formation of the face portion of the article, the marginal portion of the article is then formed. To that end fiber glass of the chopped variety is mixed with the liquid mixture and is placed on the sides of the mold recess to make the marginal portion of the article.

After the article has thus been formed it is allowed to harden, as by being exposed to the air at room temperature, or the hardening procedure may be expedited by heating the mold and article for perhaps 10 minutes in an oven at a temperature of up to about 225° F. It will be understood that the above-described mixture is self-hardening at room temperature and that while the hardening is expedited by heating, the temperature to which it is subjected for this purpose should not exceed about 225° F.

The amount of light which passes through the face portion may be varied over a wide range, as desired, and may be colored in various ways. For example, paints, dyes or inks may be mixed with the resin or colored paper or cloth may be placed between layers of the fiber glass. The surfaces of the face and side portions may be of different types, as desired, depending on the inner surface of the mold. For example, if a rough surface is desired, the inner surface of the mold will be roughened. In the same way smooth, ripple, stipple or outside lay up surfaces may be formed.

While molds composed of different materials may be used for making articles embodying the present invention I have discovered that it is preferable to use fiber glass molds for this purpose. To that end, a fiber glass mold 5 may be made in any suitable manner, as by using the above-described mixture and fiber glass of the matted variety and, after shaping this mixture to form a mold of the desired size and shape, the mixture is hardened. After preparing a mold in this manner the inner surfaces are first coated with a thin layer of a hard wax 6 and then spraying the wax coating with a solution of cellulose and acetone 7. As so prepared, the mold is ready for use in making a molded article of the present invention. After the article has been formed in such a mold, as described above, and has been hardened, the article may be stripped out of the mold. In being so removed the article carries along with it some of the wax on the mold and this wax, together with the cellulose, may be stripped from the article after removal from the mold. To use the mold to make another article of the same type it is only necessary to re-coat the mold with wax and cellulose, as just described.

Having thus described the present invention so that others skilled in the art may be able to understand and practice the same I state that what I desire to secure by Letters Patent is defined in what is claimed.

1. A translucent, hardened, resin-containing, hollow, fiber glass display article comprising a raised face portion consisting primarily of matted fiber glass and a side portion extending from the face portion at an obtuse included angle thereto, consisting primarily of unpressed chopped fiber glass and capable of passing more light therethrough than the face portion.

2. A translucent, hardened, resin-containing, hollow, fiber glass display article having a raised colored face portion consisting primarily of matted pressed fiber glass and an adjacent uncolored portion extending at an obtuse angle thereto and consisting primarily of chopped unpressed fiber glass, the adjacent portion passing more light therethrough than the face portion and having a sparkling appearance when illuminated by a light source on one side thereof.

3. The method of making a translucent, hardened, resin-containing, hollow, fiber glass article having a central, raised, face part and side parts disposed at an obtuse included angle to and about the face part which comprises the steps of applying a mixture of a catalyst, a resin, a hardening agent and matted glass fibers to part of a mold to form the central part of the article, and pressing and hardening the mixture, applying a mixture of the catalyst, resin, hardening agent, and chopped fibers to parts of the mold to form the side parts of the article without pressing, and hardening this latter mixture.

References Cited in the file of this patent

UNITED STATES PATENTS

| | | |
|---|---|---|
| 2,349,920 | Welcome | May 30, 1944 |
| 2,422,969 | Johns | June 24, 1947 |
| 2,464,157 | Scheer et al. | Mar. 8, 1949 |
| 2,477,555 | Roberts et al. | July 26, 1949 |
| 2,495,640 | Muskat | Jan. 24, 1950 |
| 2,555,505 | Plumbo | June 5, 1951 |
| 2,564,695 | Johnson et al. | Aug. 21, 1951 |
| 2,614,955 | Halsall | Oct. 21, 1952 |
| 2,626,429 | Merrill | Jan. 27, 1953 |
| 2,653,355 | Essman | Sept. 29, 1953 |
| 2,659,256 | De Olloqui et al. | Nov. 23, 1954 |